Jan. 13, 1970 A. ELICH ET AL 3,489,187
DISPENSER
Filed Aug. 19, 1966 3 Sheets-Sheet 1
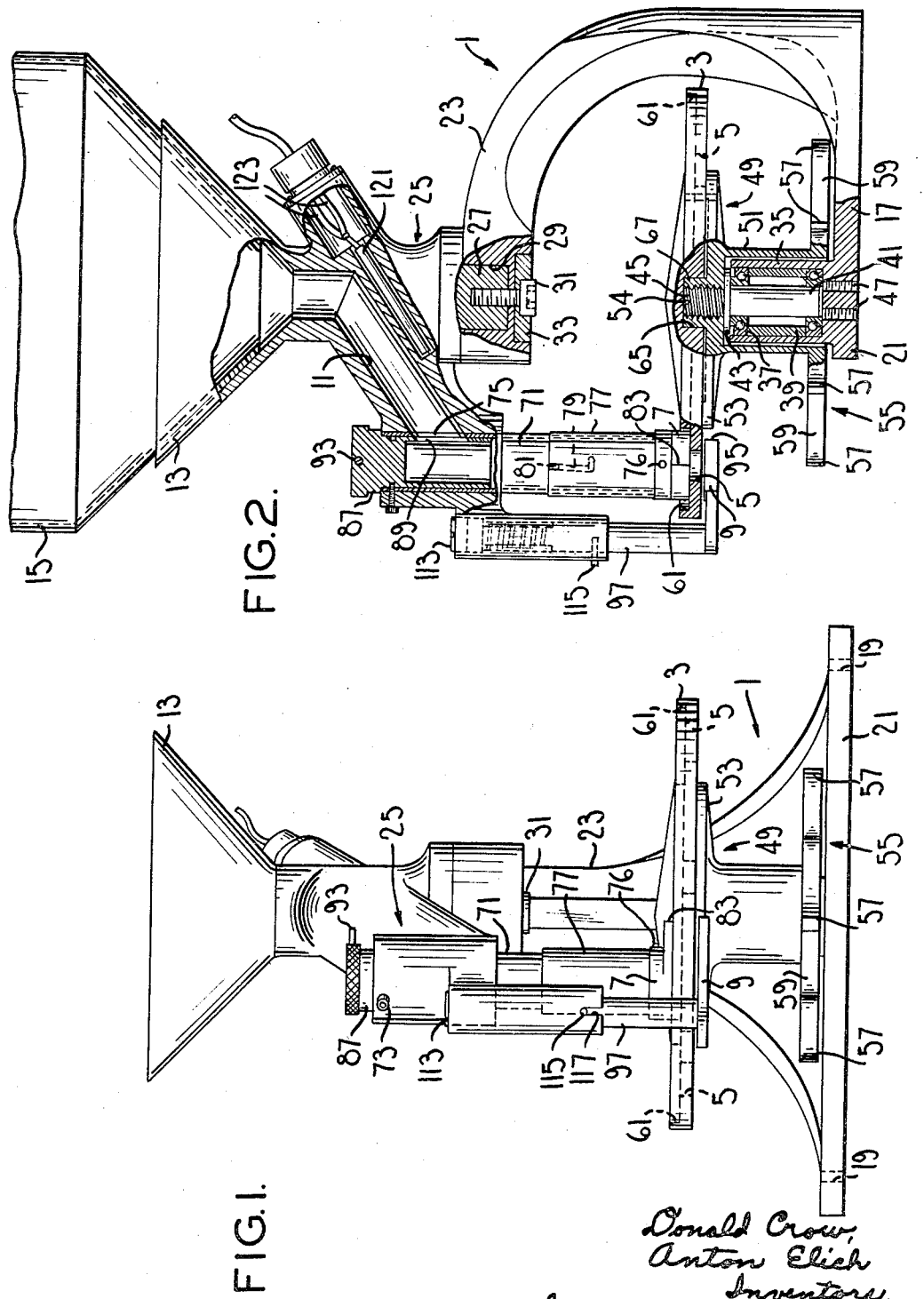
Donald Crow,
Anton Elich
Inventors.
Koenig, Senniger, Powers and Leavitt,
Attorneys.

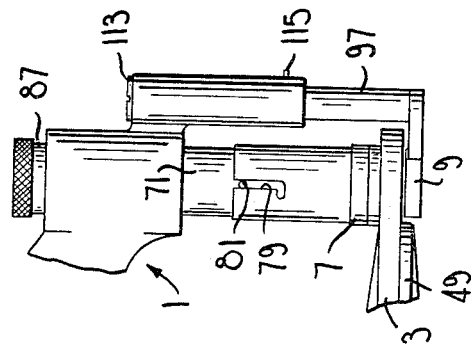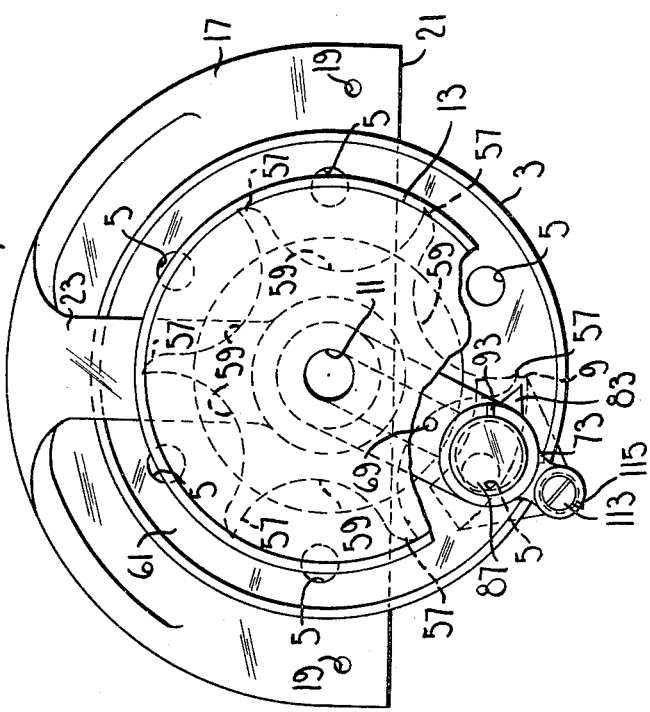

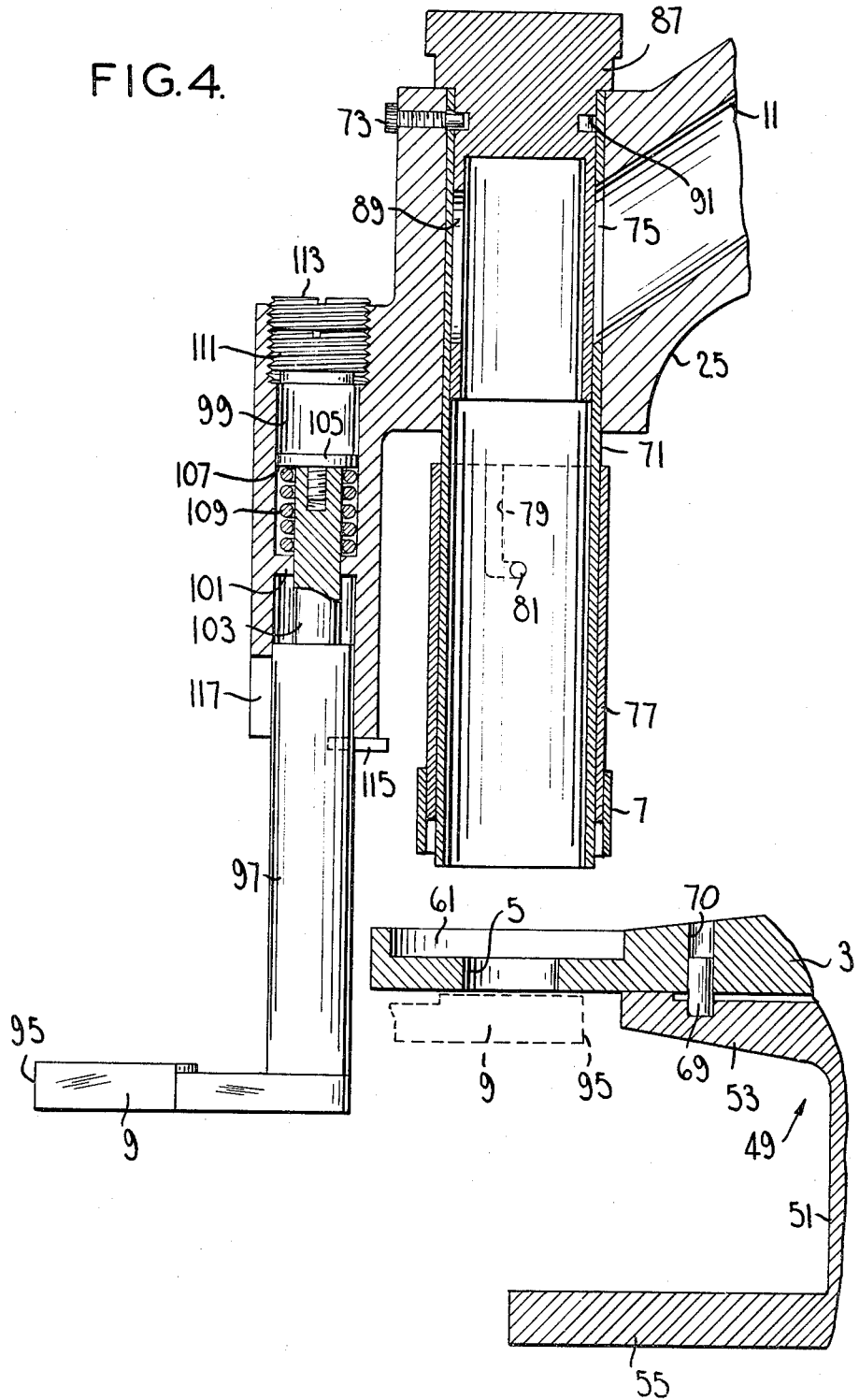

United States Patent Office 3,489,187
Patented Jan. 13, 1970

3,489,187
DISPENSER
Anton Elich, Rolling Hills, and Donald Crow, Long Beach, Calif., assignors to Ralston Purina Company, St. Louis, Mo., a corporation of Missouri
Filed Aug. 19, 1966, Ser. No. 573,701
Int. Cl. B65b *57/06;* G01f *11/24*
U.S. Cl. 141—162                     4 Claims

ABSTRACT OF THE DISCLOSURE

A dispenser for dispensing material such as salt in predetermined quantities into cans being conveyed therebelow is provided with a star wheel for serially engaging the cans. A metering disc having a plurality of holes in registry with the recesses in the star wheel is removably keyed to the star wheel and controls the amount of material fed to the cans. A feed mechanism is provided above the metering disc for supplying the material to the holes and a shoe is provided below the disc and extends a predetermined distance from the feed mechanism so that only the measured amount of material in the holes may be supplied to the cans. The feed mechanism is adapted to be moved away from the metering disc so that the disc may be per se easily lifted from the star wheel and replaced by another disc having different sized metering holes to adjust the amount of material being delivered to the cans.

---

This invention relates to metering disc type dispensers for fluent solid materials, e.g., granular material such as salt, and more particularly, to such a dispenser for dispensing metered charges of salt into cans of a food product, such as tuna fish.

Among the several objects of this invention may be noted the provision of an improved dispenser of the class described so constructed and arranged as to enable easy and rapid interchange of metering discs having metering holes of different sizes for metering different quantities of salt or the like; the provision of such a dispenser having a star wheel for rotation by cans travelling along a canning line to rotate the metering disc so constructed and arranged as to enable easy and rapid interchange of star wheels for handling different sizes of cans; and the provision of such a dispenser which provides for accuracy in metering, and which is less prone to clogging with salt, and requires less maintenance than prior dispensers of this class. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a front elevation of a salt dispenser of this invention;

FIG. 2 is an elevation, partially broken away, taken from the right side of FIG. 1 and showing a container of salt in place on the dispenser;

FIG. 3 is a plan, partially broken away, of the FIG. 1 dispenser;

FIG. 4 is an enlarged fragmentary section; and

FIG. 5 is a fragmentary elevation on a smaller scale.

Corresponding reference characters indicate corresponding parts throughout the several views of the drawings.

Referring to the drawings, a salt dispenser of this invention is shown generally to comprise a frame 1 which mounts a circular metering disc 3 for rotation about a vertical axis passing through the center of the disc. The disc has a plurality of holes 5 arranged in an annular path around the axis of rotation of the disc. A dispensing shoe 7 having a passage through it is adapted to rest on the upper face of the disc 3. A lower dispensing shoe 9 is positioned beneath shoe 7 and immediately beneath the lower surface of the disc 3. Shoe 9 is substantially wider than holes 5 and the passage through shoe 7. As disc 3 rotates the holes 5 pass between the upper and lower shoes. A salt dispensing passage 11 communicates at its upper end with a funnel-shaped reservoir 13 which receives salt or the like from a hopper or package 15 (FIG. 2). The lower end of passage 11 communicates with holes 5 through the upper shoe. Rotation of metering disc 3 coincides with movement of an open-top can of food, such as tuna fish, along a canning line and beneath the disc 3. In operation, salt flows from funnel 13 through passage 11 and through the upper shoe 7 into holes 5 as the holes pass beneath the upper shoe. The lower shoe 9, being immediately beneath the path of holes 5 in disc 3 and being wider than the passage through upper shoe 7, prevents the salt from flowing directly from passage 11 through the disc holes into the can of food. The holes pass over the side edge of the lower shoe and the salt drops from the holes into the can only after the disc moves the holes out of alignment with the passage through upper shoe 7.

More particularly, the frame 1 has a base 17 which is adapted to be mounted on a suitable supporting surface alongside a canning line by passing mounting bolts through holes 19 in the base. Base 17 is positioned so that its forward edge 21 is closely adjacent to the line of travel of cans along the canning line. The frame has an arm 23 which supports a head 25 above the base. Connection between the head 25 and arm 23 is effected by a stem 27 (FIG. 2) on the head projecting into a socket 29 at the top of arm 23. This permits rotation of head 25 relative to the arm 23 and base 17 of the frame to adjust the position at which the salt is deposited in a can. Head 25 is locked in the desired position relative to arm 23 by a cap screw 31 which extends through a washer 33 and through the arm 23 into the stem 27. Head 25 and arm 23 are spaced a sufficient distance from disc 3 so that they do not interfere with changing of a disc or turret as explained later.

Projecting upwardly from base 17 of the frame is a cylindrical post or bearing housing 35. The outer races of two bearings 37 are mounted in post 35 in spaced relation to each other. A cylindrical bearing spacer 39 is positioned between the outer races. The inner race of each bearing 37 is mounted on the shaft or stem portion 41 of a turret mounting member. The turret mounting member further comprises an annular flange 43 at the upper end of shaft 41 and a threaded end portion 45 above the shoulder. Bearings 37 and spacer 39 are easily removed for replacement or repair by removing two set screws 47 beneath the inner race of the lower bearing and inserting jack screws to force the bearings upwardly out of the top of the post 35.

An indexing turret generally designated 49 comprises a cylindrical hub or skirt 51 which surrounds post 35 and a circular plate-like head 53 which is screwed onto the threaded portion 45 of the turret mounting member. The turret mounting member has a kerf 54 for application of a screwdriver to hold the mounting member while the turret is screwed on it. Turret 49 rotates with the turret mounting member about the axis of bearings 37.

At the bottom of the hub 51 of the turret there is a star wheel 55 comprising a plurality of curved fingers 57 projecting outwardly from the hub in a generally horizontal plane, arcuate recesses 59 between the fingers being adapted to receive cans moving along the canning line. As a can is moved along the canning line and enters a recess 59, it engages a finger 57 to rotate the turret member and the disc about the axis of shaft 41.

The disc 3 has an annular groove 61 in its upper surface near the outer periphery of the disc. The holes 5 are in the groove 61 and are equally spaced from each other and from the axis of rotation of the disc. The series of holes lie in a circle concentric with the axis of the hub and each hole is in register with a recess 59 in star wheel 55. The holes are positioned beyond the rim of the turret head 53 and as the disc rotates the holes travel past a dispensing station located outwardly of edge 21 of the base. A socket 65 in the bottom of the disc receives an upwardly projecting boss 67 on the turret member. A pin 69 (FIG. 4) eccentrically mounted on the head of the turret is received in a hole 70 in disc 3 to key the disc to the turret for conjoint rotation of the disc and turret. The cooperation between socket 65 and stud 67 and the pin 69 and hole 70 constitute the only means for connecting the disc to the turret member. This mounting leaves the disc freely movable away from the turret when the upper shoe is moved from above the disc. Variation of the quantity of salt dispensed is achieved with the present invention by removing one disc 3 and replacing it with another having a different size and/or number of holes 5. The manner in which the disc is mounted makes it very easy to remove a disc 3 and replace it with another disc whereas many prior salt dispenser structures require considerable time, effort and skill to change discs. This also avoids the need for complicated structures for varying the size of hole openings required by other prior art structures.

A tubular dispensing spout 71 is mounted in a hole in head 25 of the frame and is fixed in position by a set screw 73 extending through the head and through a hole in the upper end of the spout. An opening 75 in the spout communicates with passage 11. The spout 71 constitutes part of the passage for salt. Spout 71 is mounted so that its lower end is positioned above the dispensing station and in alignment with the path of travel of the holes 5.

The upper shoe 7 has a tubular part secured by a set screw 76 (FIG. 2) to the lower end of a sleeve 77 which fits around the lower end portion of the spout 71. Sleeve 77 has a bayonet slot 79 which receives a pin 81 on the outer surface of spout 71. The slot has a vertical portion and a horizontal portion. Sleeve 77 can be moved vertically relative to spout 71 until the pin 81 is located at the lower end of the vertical portion of slot 79, and sleeve 77 can then be rotated to lock the sleeve and the upper dispensing shoe 7 in an elevated position as shown in FIG. 4. By rotating sleeve 77 to align the vertical portion of slot 79 with pin 81 the sleeve can be lowered until the shoe 7 rests on the bottom of groove 61 in upper face of the disc. Shoe 7 has an end portion 83 comprising sides which diverge from a point along planes generally tangent to the tubular part of the shoe to a width wider than the width of the holes in the disc. The end portion 83 of the shoe overlies the path of travel of holes 5 and the holes are rotated under the pointed end as they enter the dispensing station so that loose salt on the disc between the holes is deflected away from the holes 5.

A valve member 87 partially positioned in the upper end of spout 71 has a hole 89 which is substantially the same size as the hole 75 in the spout. Valve 87 can be rotated in spout 71 between an open position (FIG. 2) wherein holes 89 and 75 are aligned and a closed position (FIG. 4) wherein hole 89 is out of alignment with hole 75. Thus valve 87 controls flow of salt through the passage 11. Vertical movement of the valve relative to the spout is prevented by set screw 73 which projects into an annular groove 91 in the valve. Valve 87 is rotated by a pin 93 (FIG. 1) on the upper end of the valve. Indicia may be provided on the head 25 of the frame immediately beneath the pin 93 to indicate when the valve is opened or closed.

The lower shoe 9 has a generally arcuate inner edge 95 which is normally closely adjacent to the radially outer surface of the circular head portion 53 of the turret. The width of the shoe 9 is substantially greater than the widths of the upper shoe 7 and holes 5 so that a hole does not pass over the side edges of the shoe to permit the salt to drop from the hole into a can until the hole is out of register with the upper shoe. This prevents salt from flowing directly from the passage 11 into a can. Therefore only measured quantities of salt are delivered to a can.

Shoe 9 is vertically and rotatably adjustable. The means for effecting this adjustment is best illustrated in FIG. 4 of the drawings and includes a shaft or post 97 connected at its lower end to shoe 9. There is a chamber 99 in head 25 of the frame, the chamber being divided into upper and lower portions by an inwardly projecting annular flange 101. The upper end of post 97 is designated 103 and is somewhat smaller in diameter than the lower end portion thereof. End portion 103 projects through flange 101 into the upper end portion of chamber 99.

A retaining plug 105 threaded into end 103 of the post projects radially outwardly from the surface of the end 103 of the post to form a shoulder 107. A spring 109 reacts from the flange 101 against shoulder 107 and biases the post 97 upwardly. Upward movement of the post 97 is limited by engagement between the plug 105 and the lower end of an adjusting screw 111 in the upper end of chamber 99. A set screw 113 engages the adjusting screw 111 to hold it in its adjusted position.

A pin 115 projecting from the lower portion of post 97 is received in a slot 117 at the lower end of the chamber 99 to prevent inadvertent rotation of shoe 9 when it is in the FIG. 4 dotted-line position immediately beneath disc 3. Shoe 9 can be swung to the solid line position in FIG. 4 by pushing downwardly on post 97 against the biasing force of spring 109 until pin 115 is withdrawn from slot 117 and then rotating the post and the shoe. The post is held in this extended position by engagement of pin 115 with the head 25. The adjusting screw 111 is set so that plug 105 engages the screw when the upper surface of shoe 9 is positioned as close as possible to the lower surface of the disc 3 without contacting the disc. Shoe 9 should be close enough to the disc so that grains of salt cannot pass between the disc and the shoe.

The salt is preferably heated to keep it dry while it is in the dispensing apparatus. As shown in FIG. 2, heating of the salt is accomplished by embedding a resistance heating element 121 in head 25 adjacent the passage 11 for the salt. Heating element 121 is connected by a pair of conductors 123 to a suitable source of electric current. Heat from element 121 is conducted through head 25 of the frame to passage 11 for heating the salt in the passage.

Operation of the dispenser will now be described.

The heater 121 is preferably turned on about thirty minutes prior to operation of the dispenser. A disc 3 having the desired size and number of holes 5 in it is positioned on turret 49 and the upper and lower shoes 7 and 9 are positioned immediately above and beneath the disc 3 as shown in FIGS. 1–3 and 5 of the drawings. A package 15 of salt is placed on funnel 13 so that salt is available to spout 71.

Valve 87 is rotated to the open position shown in FIG. 2 wherein hole 89 in the valve is aligned with the hole 75 in spout 71. Then salt from funnel 13 passes through the upper portion of the passage 11 through the valve and into spout 71. This salt flows through the lower end of the sleeve 77 into the hollow passage portion of the upper shoe 7. The salt contacts the flat horizontal surface of groove 61 in disc 3 and, when a hole 5 is aligned with the opening in shoe 7, the salt flows downwardly to fill the hole. Salt cannot pass through the hole at this time because the shoe 9 is immediately beneath the hole.

As a can of food comes along the canning line it enters a recess 59 and engages a finger 57 of the star wheel 55 to rotate the turret and disc 3 about the axis of rotation of bearings 37, conjoint rotation of the disc and turret resulting from the provision of pin 69 which keys the disc to the turret. Recesses 59 in the star wheel are located beneath the holes 5 as shown in FIG. 3. The can remains beneath the hole due to the simultaneous rotation of the turret and the disc.

As the disc 3 is rotated through the dispensing station beneath the spout 71 the holes are filled with salt and and as a hole passes from beneath the upper shoe 7 the salt is leveled off at the top of the hole by the lower edge of the shoe. Thus the size of hole 5 determines the amount of salt delivered to the can. Further rotation of disc 3 moves the salt-filled hole 5 past the side edge of the shoe 9 and permits the salt in the hole 5 to drop into the can. After the can has received salt it leaves the recess 59 in the turret and continues down the canning line.

The position of shoe 9 can be adjusted so that salt drops int othe center of the can by loosening screw 31 and rotating the head 25 of the frame relative to the arm 23. The shoe moves in an arcuate path having as its center the longitudinal axis of stem 27. The axis of stem 27 is in line with the hub axis so that adjustment of the shoes does not vary the spacing between the shoes and the disc.

When it is desired to dispense a different quantity of salt the disc 3 is changed. This is accomplished by the following steps. First the salt valve 87 is rotated to its FIG. 4 closed position where the hole 89 is out of alignment with the hole 75. Then the disc 3 in place in the dispenser is rotated to a position where none of the salt dispensing holes 5 are under the top dispensing shoe. Preferably the lower shoe 9 is then pushed downwardly against the force of spring 109 until the pin 115 is disengaged from slot 117 and the post 97 is rotated to move the shoe to the FIG. 4 position. A container (not shown) is placed under the spout 71 and disc 3 is rotated to align a hole 5 with the spout 71 so that salt in the spout drops into the container.

Next the sleeve 77 and the shoe 7 on the lower end thereof are lifted until the horizontal portion of slot 79 is aligned with pin 81 and the sleeve is then rotated to the FIG. 4 position. This holds the sleeve and the upper shoe 7 in the elevated position where it is clear of the disc a distance sufficient to enable the disc to be lifted off the turret. Next the disc 3 is lifted upwardly to remove socket 65 from boss 67 and to remove hole 71 from pin 69. No tools are required for this operation. Then a new metering disc is placed on the indexing turret simply by aligning socket 65 and hole 71 with boss 67 and pin 69, respectively. When the disc is in place the lower shoe 9 is rotated until pin 115 is again aligned with slot 117 whereupon the spring 109 raises the shoe to the FIG. 4 dotted-line position immediately beneath the lower surface of disc 3. Sleeve 77 is then rotated and lowered until shoe 7 contacts the upper surface of the disc. Then valve 87 is turned to the open position where hole 89 is aligned with hole 75 to fill the spout with salt so that salt can enter holes 5 in the metering disc.

Changing of the disc can be accomplished in a very short time which reduces the amount of time the canning line must be stopped. Moreover, this simple method for changing the disc eliminates much complicated structure previously required for other disc-changing type dispensers and eliminates the need for complicated means for varying the size of a disc hole as in the case of dispensers having only one rotating disc.

When the size of the cans moving down a canning line is changed, it may be desirable to change the indexing turret 49. For example, turrets having star wheels with recesses of various sizes between 5, 6 or 7 points may be provided. The turrets are easily changed by removing disc 3, inserting a screwdriver in the slots 54 of the turret mounting member and unscrewing the turret from the threaded end 45 of the mounting member. Shoe 9 is then swung from its FIGS. 1–3 and 5 position above the turret to its FIG. 4 position wherein it is clear of the turret so that the turret can be lifted off its mounting. Shoe 7 is removed from sleeve 77 and the turret is lifted off its mounting. The new turret is placed over the mounting member and screwed onto it while the screwdriver holds the mounting member against rotation. Shoe 7 and disc 3 are replaced and shoe 9 is returned to its FIG. 2 position.

The dispenser of the invention has comparatively few parts, it is simple in design and requires very little maintenance. The bottom shoe can be adjusted so that there is no friction between this shoe and the rotating disc and the entire dispensing mechanism is adjustable so that salt can be dispensed into the center of the can. By providing a valve in the salt passage, the disc 3 can be changed without removing the salt from the hopper at the top of the machine. The salt hopper is centrally located so that the dispenser is well balanced. Also, the arrangement of the parts is such that the total weight of the salt in the hopper is not directly over the dispensing spout which provides a better and more consistent dispensing operation.

In view of the above, it will be seen that the several objects of the invention are achieved and other advantageous results attained.

What is claimed is:

1. A dispenser for material such as salt comprising a frame having a base, a turret having a hub mounted for rotation about a vertical axis on the base, a star wheel having a plurality of recesses therein on said turret and projecting beyond one edge of the base and adapted to be rotated by cans serially engaging said star wheel, a metering disc removably mounted on the hub of the turret for being per se independently lifted off the hub of said turret without removal of other structure from the turret, said disc having a series of metering holes therein spaced at intervals around a circle concentric with the axis of the hub and in registry with the recesses in said star wheel, means for keying the disc to the turret to provide a connection therebetween and permitting said disc to be per se independently lifted and removed from said turret, spout means on said frame adapted to deliver material to a metering hole in said disc, said spout means including a sleeve member movable between a lowered position adjacent the disc and a raised position spaced from said disc, the sleeve member when in its raised position being clear of said disc a sufficient distance to enable said disc to be per se lifted from said turret, and a shoe supported from the frame underlying said disc for a predetermined distance beneath said spout means for preventing direct flow of the material from said spout means into the cans and permitting only the predetermined portion of said material in the metering hole to be deposited in each of the cans.

2. The dispenser as set forth in claim 1 wherein said shoe is substantially wider than the metering holes and said spout means to prevent material from flowing directly from said spout means into the cans and said shoe is spaced from the disc to be out of frictional contact but to be closely adjacent to the bottom of the disc to prevent the material from flowing around said shoe, and said shoe terminates at a predetermined point from said spout means to enable the predetermined portion of the material to drop from the metering holes into the cans passing therebelow.

3. A dispenser as set forth in claim 1 wherein the hub has a head at its upper end, the disc being removably disposed on the top of said head and adapted to be freely lifted off the head, and wherein means is provided centering the disc on the hub, the disc extending radially beyond the head and the holes in the disc lying outward of the periphery of the head.

4. A dispenser as set forth in claim 3 wherein the turret is removably mounted on the base for being lifted off the base for ready replacement with another turret having a different star wheel for handling cans of another size.

References Cited

UNITED STATES PATENTS

| 2,299,717 | 10/1942 | Emmons et al. | 222—370 X |
| 2,515,594 | 7/1950 | Fischman | 222—370 X |
| 2,673,017 | 3/1954 | Emmons et al. | 141—162 X |
| 2,833,443 | 5/1958 | Prickett et al. | |

FOREIGN PATENTS

| 1,303,147 | 7/1962 | France. |

LAVERNE D. GEIGER, Primary Examiner

EDWARD J. EARLS, Assistant Examiner

U.S. Cl. X.R.

222—370